(12) United States Patent
Dominguez et al.

(10) Patent No.: US 10,605,134 B2
(45) Date of Patent: Mar. 31, 2020

(54) INTEGRATED EXHAUST GAS MANAGEMENT DEVICE

(71) Applicant: BorgWarner Emissions Systems Spain, S.L.U., Vigo, Pontevedra (ES)

(72) Inventors: Xoan Xosé Hermida Dominguez, Pontevedra (ES); Sonia Civeira Dominguez, Pontevedra (ES); Salvador Garcia Gonzalez, Pontevedra (ES)

(73) Assignee: BorgWarner Emissions Systems Spain, S.L.U., Vigo, Pontevedra (ES)

( * ) Notice: Subject to any disclaimer, the term of this patent is extended or adjusted under 35 U.S.C. 154(b) by 933 days.

(21) Appl. No.: 14/735,421

(22) Filed: Jun. 10, 2015

(65) Prior Publication Data

US 2015/0354506 A1    Dec. 10, 2015

(30) Foreign Application Priority Data

Jun. 10, 2014   (EP) .................................... 14382216

(51) Int. Cl.
*F01N 3/035* (2006.01)
*F28F 19/01* (2006.01)
(Continued)

(52) U.S. Cl.
CPC ............. *F01N 3/035* (2013.01); *F02M 26/15* (2016.02); *F02M 26/25* (2016.02); *F02M 26/32* (2016.02);
(Continued)

(58) Field of Classification Search
CPC ........ F02M 26/15; F02M 26/25; F02M 26/26; F02M 26/28; F02M 26/32; F02M 26/29;
(Continued)

(56) References Cited

U.S. PATENT DOCUMENTS 6,141,961 A * 11/2000 Rinckel ................... F01N 3/043
60/274
7,527,126 B2 * 5/2009 Kuroda .............. B01D 53/9454
181/254
(Continued)

FOREIGN PATENT DOCUMENTS

DE          4430648 A1 *  3/1996  ......... F28D 21/0003
DE   102010003798 A1    10/2011
(Continued)

OTHER PUBLICATIONS

English machine translation of EP 2273095 A1 provided by ESPACENET.*

(Continued)

*Primary Examiner* — Jacob M Amick
*Assistant Examiner* — Michael A Kessler
(74) *Attorney, Agent, or Firm* — BrooksGroup

(57) ABSTRACT

The present invention relates to a device for managing gases suitable for being installed at the outlet of a particle filter or a catalytic converter. This device is characterized by a very compact configuration combining at least the heat exchanger for an EGR (Exhaust Gas Recirculation) system, particularly suitable for a low-pressure system, and an exhaust gas outlet pipe with a special configuration that is part of the exhaust line. The exhaust outlet incorporates a valve that allows using the heat exchanger of the EGR system as a heat recovery unit.

9 Claims, 4 Drawing Sheets

(51) Int. Cl.
  *F02M 26/32* (2016.01)
  *F02M 26/15* (2016.01)
  *F02M 26/25* (2016.01)
  *F28F 27/02* (2006.01)
  *F28F 1/42* (2006.01)
  *F01N 5/02* (2006.01)
  *F02G 5/02* (2006.01)

(52) U.S. Cl.
  CPC .............. *F28F 1/426* (2013.01); *F28F 19/01* (2013.01); *F28F 27/02* (2013.01); *F01N 5/02* (2013.01); *F01N 2240/02* (2013.01); *F02G 5/02* (2013.01); *F28F 2250/06* (2013.01)

(58) Field of Classification Search
  CPC .. F28D 7/163; F28D 21/0003; F28F 2250/06; F28F 1/426; F28F 9/0278; F28F 9/026; F28F 27/02; F01N 3/043; F01N 3/046; F01N 5/02; Y02A 50/232; Y02A 50/2322; Y02T 10/16
  USPC .............. 123/568.12; 60/288, 287, 298, 320
  See application file for complete search history.

(56) References Cited

U.S. PATENT DOCUMENTS

| | | | | |
|---|---|---|---|---|
| 9,664,087 | B2* | 5/2017 | Sloss | F01N 5/02 |
| 2003/0046926 | A1* | 3/2003 | Watanabe | F01N 3/0814 |
| | | | | 60/278 |
| 2009/0014674 | A1* | 1/2009 | Grissom | F01D 17/145 |
| | | | | 251/298 |

FOREIGN PATENT DOCUMENTS

| | | | | |
|---|---|---|---|---|
| EP | 0913561 | A2 | 5/1999 | |
| EP | 2273095 | A1 * | 1/2011 | F28F 19/01 |
| EP | 2743488 | A1 | 6/2014 | |
| JP | 2003083050 | A | 3/2003 | |
| JP | 2009516803 | A | 4/2009 | |
| KR | 1020060058330 | A | 5/2006 | |
| WO | 2007060172 | A1 | 5/2007 | |

OTHER PUBLICATIONS

Korean Office Action dated Oct. 12, 2017; Application No. 10-2015-0080345; Applicant: BorgWarner Emissions Systems Spain S.L.U.; 9 pages.

* cited by examiner

INTEGRATED EXHAUST GAS MANAGEMENT DEVICE

CROSS-REFERENCE TO RELATED APPLICATIONS

This application claims the benefit of European Patent Application Serial No. EP14382216.1 filed Jun. 10, 2014.

OBJECT OF THE INVENTION

The present invention relates to a device for managing gases suitable for being installed at the outlet of a particle filter or a catalytic converter. This device is characterized by a very compact configuration combining at least the heat exchanger for an EGR (Exhaust Gas Recirculation) system, particularly suitable for a low-pressure system, and an exhaust gas outlet pipe with a special configuration that is part of the exhaust line. The exhaust outlet incorporates a valve that allows using the heat exchanger of the EGR system as a heat recovery unit.

BACKGROUND OF THE INVENTION

One of the fields of the art that has been subjected to more intensive development is the field of EGR systems for thermal combustion engines since recirculating exhaust gas requires solving many technical problems given the demands of handling a high temperature gas that contains corrosive products, may generate condensates, and furthermore also contains particles that may damage sensitive parts of the engine.

In this scenario, each of the functions necessary in an EGR system is handled by a component dedicated to solve said function. The increase in components suitable for solving particular technical problems and of additional functions in EGR gas management has larger space requirements and since the engine bay in a vehicle is limited, the solutions used today seek higher degrees of packing or compactness.

This higher degree of packing is obtained by searching for cavities and gaps where the different devices can be arranged, adapting their shape to adjust them to said cavities without being considerably detrimental to operation. These devices are communicated with pipes establishing fluid connection (for example of the EGR gas or a coolant) with the point of the circuit where an inlet or outlet must be incorporated in a certain circuit or system.

One of the examples of the devices requiring packing solutions is the heat exchanger of an EGR system (known as EGR cooler). Once located in the suitable place with an orientation also suitable to comply with packing and operating requirements, the EGR heat exchanger requires inlet pipes from the exhaust pipe and outlet pipes for the cooled gas heading towards the intake of the internal combustion engine with the interposition of an EGR valve for managing the recirculated gas flow rate or for managing the gas heading towards the exhaust.

The low-pressure systems are those in which the EGR system is on the low-pressure side with respect to the turbo-compressor unit.

Particularly, low-pressure EGR systems use a catalytic converter, a particle filter primarily for catching cinder or both. In addition to these filters, there are other filters typically referred to as emergency filters that prevent very hard solid particles, such as ceramic particles, for example, that have detached from previous filters, from reaching the compressor. The compressor blades are particularly sensitive and the introduction of solid particles causes serious damage to this device. Throughout the text, when only particle filter or antiparticle filter or catalytic converter is indicated, it refers to the former unless otherwise explicitly indicated.

The most commonly used solutions in the state of the art require pipes establishing a connection between the particle filter outlet or the catalytic converter outlet and the EGR heat exchanger inlet, and also between the EGR heat exchanger outlet with the intake of the engine, usually with the interposition of the EGR valve.

Although this configuration allows a certain degree of packing, the use of pipes which also take up space is still required.

The present invention solves the problem of the use of pipes and of obtaining a higher degree of packing by integrating the EGR heat exchanger with the catalytic converter or with the particle filter, establishing a particular structure of the heat exchanger such that it adapts to the large outlet diameter of either the catalytic converter or the particle filter. The configuration of the exchanger, which is adapted to be integrated in the catalytic converter or in the particle filter, additionally incorporates a valve particularly configured so that the heat exchanger of the EGR system can be used to recover heat from the exhaust pipe when the EGR gas does not need to be cooled.

The modular configuration, defining a first module for the catalytic converter, the particle filter or both, and a second module for the heat recovery unit, facilitates the independent manufacture of both and its easy replacement. Likewise, the configuration of both with a screwed attachment according to the special manner of being attached to one another assures a secure and quick attachment.

The device of the invention is of particular interest as it also pertains to technical solutions leading to environmentally friendly vehicle engines.

DESCRIPTION OF THE INVENTION

The device according to the invention is an integrated exhaust gas management device adapted to be installed at the outlet port of an antiparticle filter or catalytic converter of a low-pressure EGR system.

The device is in turn formed by two interrelated products, a first interrelated product provided in the form of a catalytic converter or particle filter particularly adapted to receive a heat recovery unit, and a second interrelated product provided in the form of a heat recovery unit which is anchored in the first interrelated product. Both lead to an integrated device that allows recovering heat by retaining the function of a heat exchanger for cooling the EGR gas.

Particularly, it has been indicated that the first interrelated product is provided in the form of a catalytic converter or a particle filter, understanding that there may be a catalytic converter, a particle filter or both therein. This first interrelated product comprises:

a primarily cylindrical main body defining a longitudinal direction, with a gas inlet at a first end and a gas outlet at a second end opposite to the first end, where the main body internally comprises a catalytic converter, a particle filter or both, a support adapted to anchor a heat recovery unit, where said support:
  is formed by a plate with one or more perforations for the passage of gas; and,
  comprises attachment means adapted to fix the heat recovery unit.

The gas inlet into the main body carries gas from the internal combustion engine. It is treated in said main body by means of the catalytic converter, antiparticle filter or both. The outlet which is where the main body has means for receiving and anchoring the second interrelated product is arranged at the other end.

The anchoring is established in a support located in the first interrelated product, particularly adapted to take in the second interrelated product. The support is formed primarily by a plate having one or more perforations therein. According to one embodiment, if the plate has one gas outlet perforation, this perforation has access to two of the components of the second interrelated product, to a heat exchanger and to what will be referred to as exhaust pipe.

According to another embodiment, if the support has more than one perforation, then at least the passage of gas through one perforation feeds the heat exchanger and the passage through another perforation feeds the exhaust pipe. In any case, the configuration of the support with its perforation or perforations has to be consistent with the configuration of the heat recovery unit.

The integration of the first interrelated product and second interrelated product linked by means of the support and the attachment means for fixing the heat recovery unit allows the manufacture and subsequent replacement, for example, regardless of if the products are from different manufacturers, each of these manufacturers being able to be specialized in different technologies, i.e., one related to filters and catalytic converters and another one related to heat exchangers and valves.

The configuration of the second interrelated product, the one provided in the form of a heat recovery unit, comprises:
a heat exchanger formed by a shell housing one or more exchange tubes or pipes extending in a longitudinal direction X-X', where the tube or the plurality of tubes or pipes extend between a first inlet or outlet and a second inlet or outlet arranged at both ends of the shell, respectively; and where the inside of the heat exchanger is adapted to allow the circulation of a coolant fluid to remove the heat from the fluid passing through the tube or the plurality of tubes.

The heat recovery unit is a device that receives gas from the first interrelated product and which is in turn from the internal combustion engine. This gas resulting from combustion is at a high temperature and its final destination is to either head towards the exhaust line for being evacuated into the atmosphere or towards the intake of the combustion engine as EGR gas, being able to head towards both destinations in a partial manner.

The heat exchanger is responsible for removing heat from the gas from the first interrelated product and transferring it to a coolant fluid. The coolant fluid circulates through the space defined between the exchange tube/pipe or tubes/pipes and the shell. The distinction between tubes and pipes is due to the fact that it is possible to configure the heat exchanger according to the structure known as "stacked" configuring the pipes by means of die-cut stamped sheets which, once stacked, give rise to the pipes. In this case, it is the cavity or passage through the pipes defining the stack that establishes the longitudinal direction X-X'. Once part of the heat has been removed, the cooled gas can be introduced as EGR gas into the intake of the internal combustion engine. Nevertheless, depending on the engine operating conditions, it is not always necessary to recirculate EGR gas, or the necessary flow rate may be reduced. In these cases, all or part of the exhaust gas is evacuated into the atmosphere. The configuration of the second interrelated product allows in these cases continued use of the same heat exchanger for removing heat from the exhaust gas and using this heat which would otherwise be evacuated into the atmosphere without using its energy content. Hence, the second interrelated product is identified as a heat recovery unit.

The configuration of the heat exchanger, and particularly the exchange tube or tubes, define a longitudinal direction X-X' which is the same as the longitudinal direction X-X' defined by the main body of the first interrelated product when the first interrelated body and second interrelated body are attached, forming the integrated device for managing exhaust gases.

If, for example, the shell of the heat exchanger or the main body of the first interrelated product is a cylinder, then the axis of the cylinder is what defines the longitudinal direction regardless, for example, of said cylindrical elements being able to have a recess or projection due to geometric space requirements on some portion of their surface.

In any case, the term cylinder must be interpreted in its broadest sense, i.e., a surface generated by a curved generatrix displaced along a directrix defined by a straight line. If the generatrix is a circumference, the cylinder will have a cylindrical section, and if the generatrix is square, then the section of the cylinder will be square, and in any case, the term cylinder or cylindrical will continue to be used. In the described embodiments, the directrix is the longitudinal direction X-X'.

an exhaust pipe arranged essentially parallel to the longitudinal direction X-X'.

Both the heat exchanger and this pipe referred to as exhaust pipe are arranged parallel to one another. The exhaust pipe is a pipe that allows the passage of gas in both directions as determined by a valve that will be introduced later. This pipe is identified as the exhaust pipe, unlike the exhaust line which is the duct that conducts the gas into the atmosphere.

a base formed essentially by a plate, oriented essentially perpendicular to the longitudinal direction X-X', adapted to be coupled and fixed to a support, particularly the support of the first interrelated product, where this base presents at least:
a first perforation coinciding with a perforation of the support in its operating position, housing one end of the heat exchanger,
a second perforation coinciding with a perforation of the support in its operating position, housing one end of the exhaust pipe.

The base formed essentially by a plate is the part that is particularly adapted to rest in the support of the first interrelated product and to be anchored to it. The base is anchored to the first interrelated product through attachment means. In the embodiments, the attachment means are perforations which allow the passage of screws screwed into threads of the support of the first interrelated product coinciding axially with the perforations of the base. The perforations receiving the gas exiting the first interrelated product through the perforation or perforations in the support on which the second interrelated product is fixed are located in this base.

a manifold in turn comprising:
a first seat housing one end of the heat exchanger, i.e., the end opposite to the end housed in the base,
a second seat housing one end of the exhaust pipe, i.e., the end opposite to the end housed in the base,
an outlet pipe.

The gas exiting the first interrelated product heads towards the second interrelated product through the two openings in the base of the second interrelated product. A certain gas flow rate can be conducted towards the heat exchanger and another flow rate can be conducted towards the exhaust pipe because one of the ends of both components, i.e., the heat exchanger and the exhaust pipe, coincide with the perforations of the base. The manifold is the element located at the other end of both the heat exchanger and the exhaust pipe. The base is located at one end of both the heat exchanger and the exhaust pipe, and the manifold is located at the other end, where they do not necessarily have to be located at the final end thereof. A distinction is made between end and final end when the latter term identifies the final portion of the element and the former does not necessarily have to be located at the final portion, but rather in a region close to the final portion. For example, final end of a pipe will be interpreted to mean the edge of the end of the pipe whereas the end of the pipe can be a perimetral region close to the final edge. In this particular case, for example, the final end of the end of the heat exchanger corresponding with the base can be arranged beyond the base, even invading the inner space of the first interrelated product. In this case, a distinction is made between end, the portion of the shell where the cooler is attached, and final end, which in this case is arranged in cantilever fashion. In this embodiment, the existence of a space or chamber in the area of the support of the first interrelated product allows using longer exchangers at the expense of invading this space, giving rise to a higher degree of assembly integration. The same occurs on the manifold side, at the other end of both the exhaust pipe and the heat exchanger, where according to other embodiments it is possible for one of the components, the other of the components or both components of the manifold side to be prolonged at the end thereof, invading a portion of the inner space of the manifold.

a valve interposed in the exhaust pipe with an outlet in fluid communication with an exhaust line such that the valve has two end positions:
        a first end position allowing passage from the first interrelated product to the exhaust line, closing communication between the manifold and the exhaust line for cooling EGR gas; and,
        a second end position allowing passage from the manifold to the exhaust line, closing communication between the first interrelated product and the exhaust line for recovering heat by means of the heat exchanger,
    such that the heat exchanger and the exhaust pipe together with the valve thereof are interposed between the base plate and the manifold.

The valve interposed in the exhaust pipe has two inlets, one inlet from the first interrelated product and another inlet from the manifold. The outlet is in fluid communication with the exhaust line. Although the valve can have intermediate positions, with respect to the end positions, said valve can close either inlet.

If the valve closes the inlet of the manifold, the first end position, communication is established between the gas inlet carrying gas from the first interrelated product and the exhaust line. In this position, the gas from the first interrelated product can head towards the heat exchanger or the exhaust line. The flow rate circulating through either alternative depends on the resistance the gas encounters downstream.

Given that the passage from the manifold towards the outlet line is closed by the valve, the gas passing through the heat exchanger can only head towards the intake of the internal combustion engine depending on the degree of aperture of the EGR valve.

The passage of the exhaust line is always open because the internal combustion engine would otherwise stop as it would not be able to evacuate exhaust gases into the atmosphere. The aperture of the EGR valve will allow the passage of EGR gas towards the engine depending on the ratio of resistances encountered by the gas to pass through both alternatives. In all the embodiments, it is possible to incorporate in the exhaust line a valve that constricts it, increasing pressure to favor a higher recirculated EGR gas flow rate.

In this first end position, the sole purpose of the heat exchanger is to reduce the temperature of the EGR gas.

If the valve closes the inlet from the first interrelated product and leaves the inlet from the manifold open, which configuration is identified as the second end position of the valve, then the gas from the first interrelated product can only access the heat exchanger.

The gas is cooled after it passes through the heat exchanger, transferring heat to the coolant fluid. The gas reaches the manifold after it has been cooled. It has two alternatives once it is in the manifold, i.e., it can either be reintroduced into the intake of the internal combustion engine as recirculated EGR gas, or it can head towards the exhaust line by passing through the valve.

The case in which it is not necessary to recirculate EGR gas or it is only necessary to recirculate EGR gas with a flow rate that is smaller than the maximum flow rate is of particular interest. In this case, the second end position of the valve forces the gas to also pass through the heat exchanger, transferring heat to the coolant fluid. This heat would have otherwise ended up being evacuated into the atmosphere without passing through any heat exchanger that recovers part of its thermal energy. The heat transferred by the gas to the coolant is recovered heat that can be applied, for example, to heat the vehicle interior or to increase the temperature of the engine oil, among other applications, after start up until said oil reaches the nominal temperature, improving the engine performance.

The final condition imposed on the second interrelated product, i.e., the heat exchanger and exhaust pipe together with the valve thereof being interposed between the base plate and the manifold, assures a very compact and integrated configuration facilitating the incorporation of all the elements without these elements necessarily need to take up a space which exceeds, in projection, the section of the first interrelated product. In other words, the second interrelated product can be configured as a prolongation of the first interrelated product.

DESCRIPTION OF THE DRAWINGS

The foregoing and other features and advantages of the invention will become clearer based on the following detailed description of a preferred embodiment given only by way of illustrative and non-limiting example in reference to the attached drawings.

DETAILED DESCRIPTION OF THE INVENTION

Figure 1:
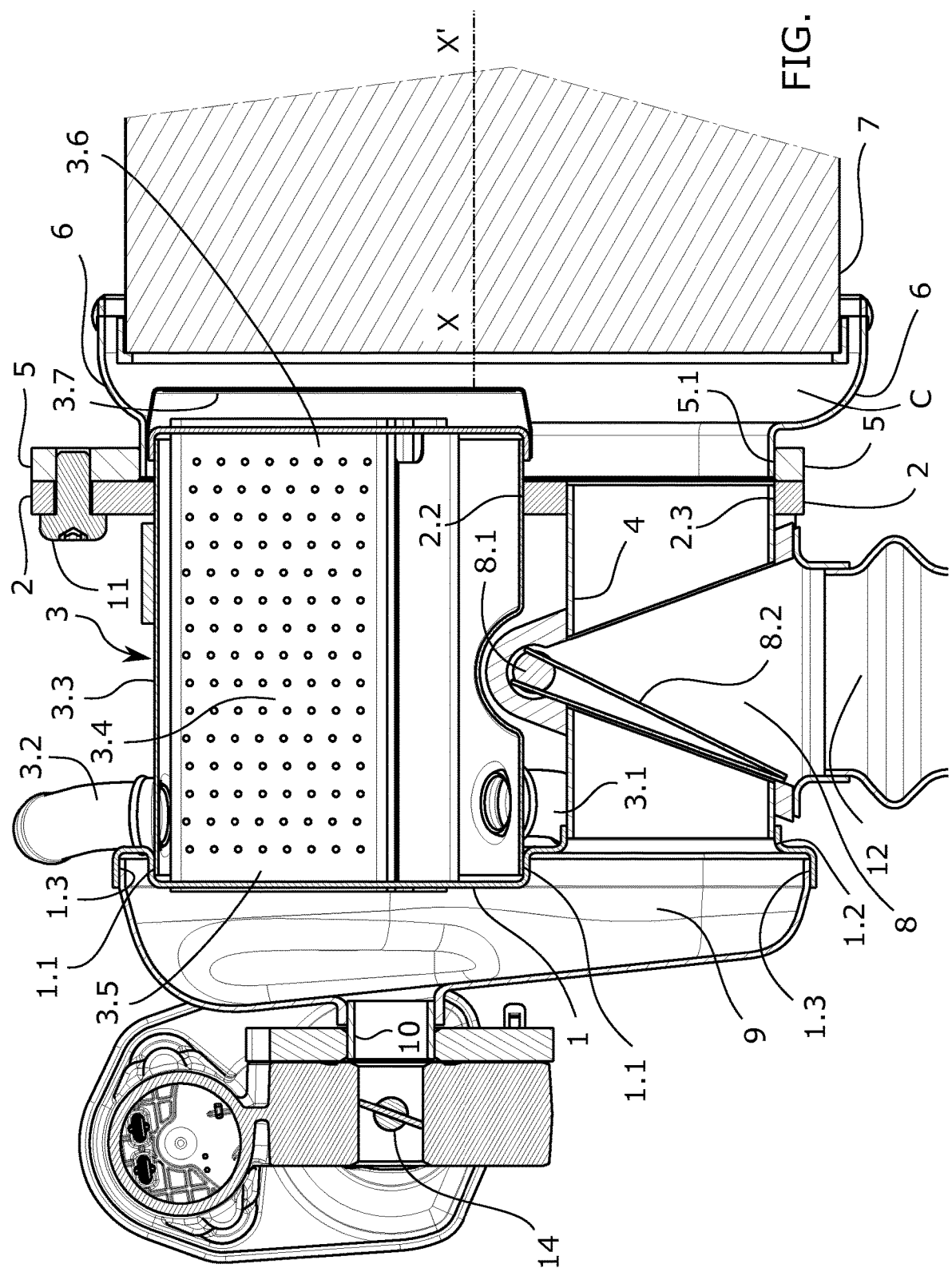
FIG. 1 shows a first embodiment of the invention, where a section of both the first interrelated product and the second interrelated product is shown, this section being essentially parallel to the longitudinal direction X-X' defined by both the main body of the first interrelated product and the exchange tubes of the heat exchanger. In this first figure, the valve is in the position identified as first end position.
Figure 2:
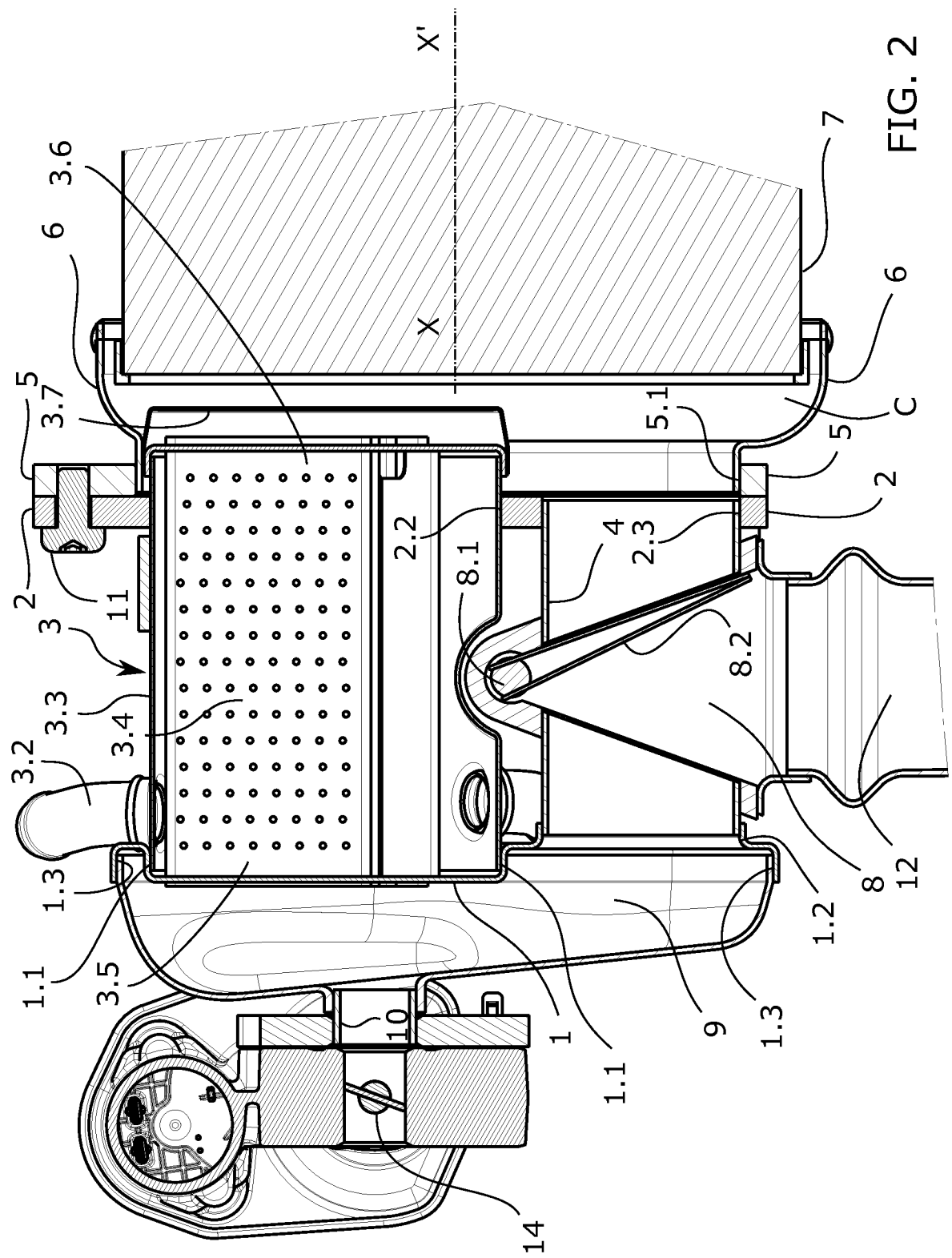
FIG. 2 shows the same embodiment of the invention as in the preceding figure and according to the same section. In this figure, the valve is in the position identified as second end position.

FIGS. 1 and 2 show a section of an embodiment of the invention where the main components arranged therein can be seen.

With respect to the particular orientation chosen in depicting the drawings, the first interrelated product for integrated exhaust gas management provided in the form of a catalytic converter or a particle filter is located on the right side, and the second interrelated product provided in the form of a heat recovery unit is located on the left side. They are both attached to one another, forming an integrated device.

The first interrelated product comprises a main body (7) which is cylindrical in this embodiment and defines a longitudinal direction X-X'. The catalytic converter and particle filters are housed inside the main body (7).

The main body (7) is sectioned and only the end having a support (5) formed from a plate, the support (5) of the first interrelated product, is depicted. On the right, the first interrelated product receives gas from the engine, which then passes through the catalytic converter and particle filter, and exits at the end where the support (5) is located.

Figure 3:
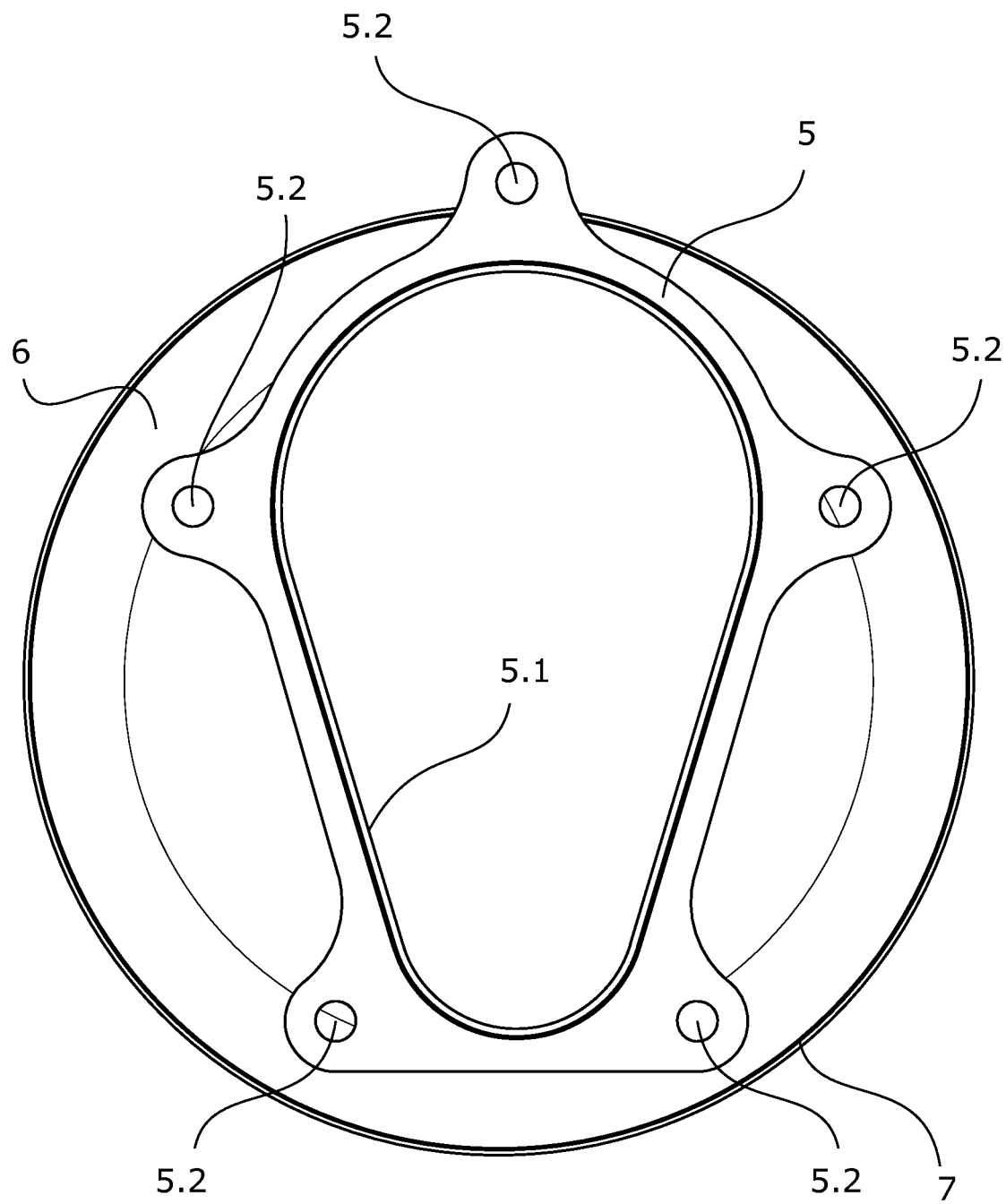
FIG. 3 shows the first interrelated product shown from the heat recovery unit side to allow observing the support of the first interrelated product on which the second interrelated product is fixed.

FIG. 3 shows the first interrelated product with the plate of the support (5) located parallel to the paper on which the figure is depicted. The support (5) is configured from a plate and shows a single inner perforation (5.1) with a first circular sector, i.e., that shown in the upper portion of FIG. 3, and a second circular sector in the lower portion which are connected by means of two tangents, giving rise to a semi-oval shape. This single inner perforation (5.1) has a configuration that allows feeding the gas exiting this first interrelated product to the heat exchanger (3) and also the exhaust pipe (4) inlet located in the second interrelated product.

According to another embodiment, the support (5) shows two different inner perforations (5.1), each of such perforations (5.1) being dedicated to delivering gas to both components (3, 4).

There are threaded perforations (5.2) in the periphery of the support for receiving lock screws (11) for attaching the second interrelated product.

In the embodiment shown in the drawings, there is an adaptation surface (6) constituted by a part made of stamped sheet establishing the transition between the main body (7) and the support (5) such that the gas exiting the main body (7) heads towards the perforation (5.1) of the support so that it can in turn reach the components (3, 4) of the second interrelated product.

The adaptation surface (6) surrounds the outlet of the main body (7) such that all of the gas exiting the main body heads towards the second interrelated product. In the embodiment, the adaptation surface (6) is welded to a perimetral ring which is in turn attached to the outer surface of the main body (7).

The adaptation surface (6) establishes a structural link between the first interrelated product and the second interrelated product. Although the heat exchanger (3) and the exhaust pipe (4) are parallel to the longitudinal direction X-X' established by the main body (7) of the first interrelated product, the condition of being parallel does not necessarily mean that the components are aligned. The adaptation surface (6) allows adapting the outlet section for the gas from the first interrelated product with the inlets of the second interrelated product according to the relative positions between the outlet and the inlets.

Alternatively, this adaptation can also be carried out by inserting the adaptation surface (6) into the outlet of the main body (7), for example with an attachment welded to the inner cylindrical wall of said main body (7).

The adaptation surface (6) gives rise in this embodiment to an inner chamber (C) where the heat exchanger (3) can enter, for example, if it has a final end that prolongs beyond the part forming the base (2), and also even beyond the plate of the support (5), the base (2) being the element which serves for coupling and fixing the second interrelated product to the support (5) of the first interrelated product.

Figure 4:
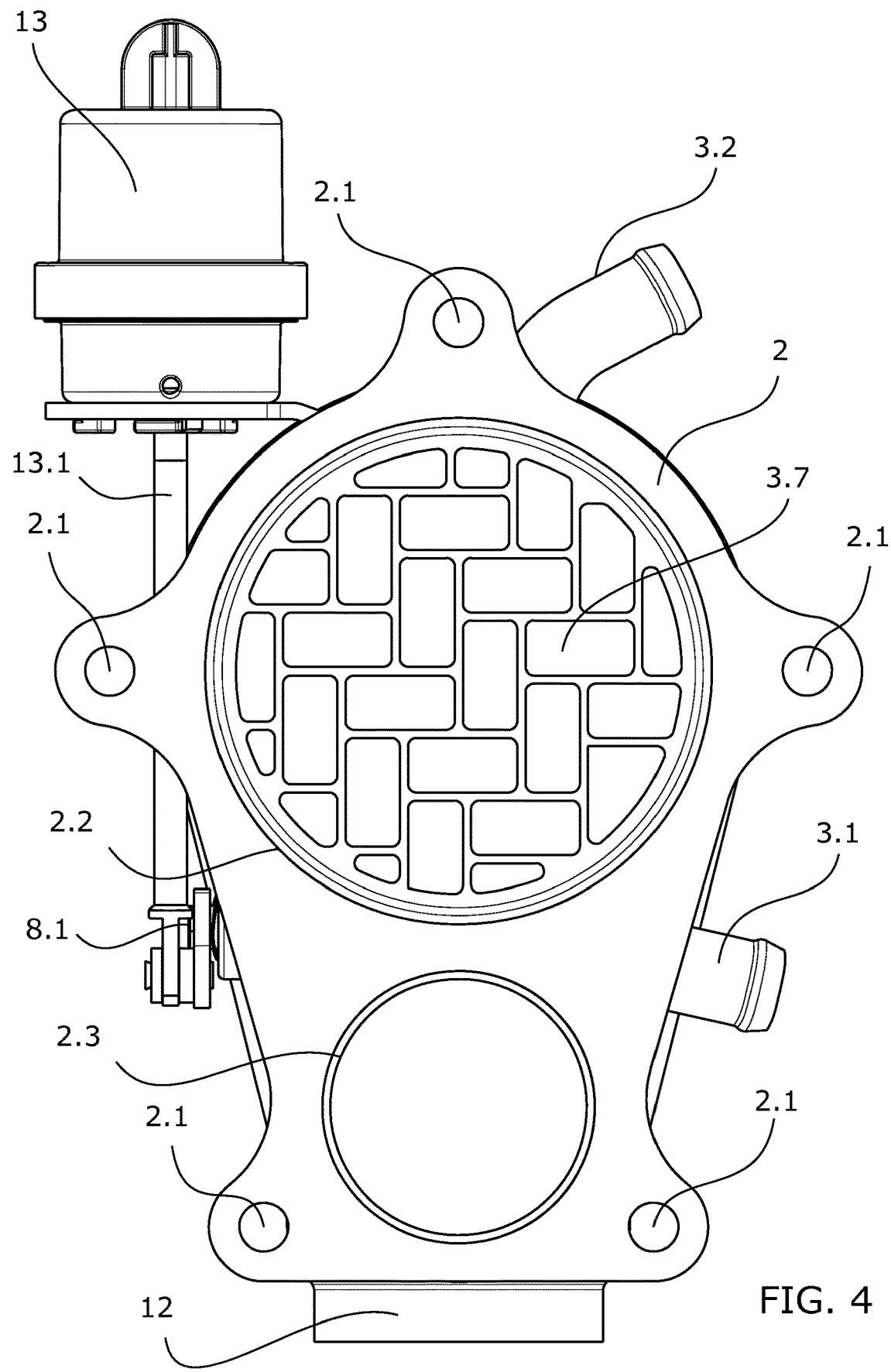
FIG. 4 shows the second interrelated product shown from the side of the first interrelated product to allow observing the base of the second interrelated product, which is fixed on the support of the first interrelated product.

The base (2) of the second interrelated product in this embodiment of the invention is also formed from a sheet. The configuration of this sheet is shown in FIG. 4, where the correspondence between the base (2) and the support (5) can be seen.

The base (2) has a configuration that perimetrically coincides with the support (5); it particularly has perforations (2.1) for the passage of screws (11) for attaching it with the support (5), coinciding in projection with the threaded perforations (5.2) of the support (5). Internally, which is understood to mean not on the periphery, the base (2) has two perforations, one perforation (2.2) having a larger diameter being located coaxial with the circular sector having the largest diameter of the inner perforation (5.1) of the support (5) once attached to said support (5), and one perforation (2.3) having a smaller diameter, said perforation (2.3) being located coaxial with the circular sector having the smallest diameter of the same inner perforation (5.1) of said support (5).

As shown in FIGS. 1 and 2, the second interrelated product has at one end the base (2) adapted to act as a seat and to be fixed to the support (5), preferably with the interposition of a sealing gasket, and has at the other end a manifold (9).

Two components arranged parallel to one another, i.e., the heat exchanger (3) and the exhaust manifold (4), are located between the manifold (9) and the base (2).

If both components are received in the base (2) by one of the ends, i.e., the right end, by means of perforations (2.2, 2.3), they are received at the other end by means of seats formed in a flange (1). In this embodiment, the flange (1) is configured by means of a die-cut stamped sheet. A first seat (1.1) formed by a slight embossment with perforations for the passage of gas exiting the heat exchanger (3) is shown in the upper portion of FIGS. 1 and 2, and a second seat (1.2) formed by a short tubular segment surrounding the exhaust pipe (4) is shown in the lower portion of said FIGS. 1 and 2. The manifold (9) establishes fluid communication between the outlet of the heat exchanger (3) and one side of the exhaust pipe (4).

The flange (1) configured by stamping has three seats configured in this embodiment, i.e., the two seats (1.1, 1.2)

described for receiving the heat exchanger (3) and the exhaust pipe (4), respectively, and a third seat (1.3) oriented opposite to the first two intended for receiving another stamped part which is what gives rise to the manifold (9).

In turn, the manifold (9) has an outlet (10) in fluid communication with the EGR valve (14) for managing the flow rate of the gas cooled by the heat exchanger (3) which is recirculated towards the intake of the internal combustion engine.

The heat exchanger (3) is formed by a shell (3.3) having a tubular configuration extending along the longitudinal direction X-X' between a first inlet or outlet (3.5) and a second inlet or outlet (3.6) arranged at both ends of the shell (3.3), respectively. The shell (3.3) has an inlet and an outlet (3.1, 3.2) for the coolant intended for evacuating heat from the gas passing through the heat exchange tubes (3.4) extending from one end of the heat exchanger (3) to the other.

At the end of the heat exchanger (3) located on the right side, on the support (5) side, there is an emergency filter (3.7) to prevent the particles generated during combustion from reaching a turbo-compressor, for example, damaging its moving parts. In this embodiment, the emergency filter (3.7) is projected towards the inside of the chamber (C) formed in this case by means of the adaptation surface (6). According to another embodiment, the emergency filter (3.7) is located on the opposite side, invading the manifold (9).

The heat exchange tubes (3.4) used in this embodiment are hybrid tubes formed by a planar tubular body incorporating therein a corrugated lamina forming inner fins increasing turbulence and heat exchange. The heat exchange tubes (3.4) are located such that they are moved towards the portion that is shown at the top in FIGS. 1 and 2, leaving in the lower portion space for a recess that allows housing the valve (8) which is intercalated in the exhaust pipe (4). Particularly in this embodiment, the recess of the shell (3.3) facilitates housing the area of the shaft (8.1) acting on the flap (8.2) of the valve (8).

FIG. 4 shows the actuator (13) with the actuation rod (13.1) intended for moving the shaft (8.1) of the valve (8) which is integral with the flap (8.2) of said valve (8) for managing the gas inside the second interrelated product.

With respect to the views in FIGS. 1 and 2, it can be seen that the exhaust pipe (4) extends from the manifold (9) to the perforation (2.3) having the smallest diameter of the base (2) through which it receives gas. Nevertheless, due to the interposition of the valve (8), this exhaust pipe (4) does not carry gas from one end to the other, but rather both ends are gas inlets with respect to any of the two end positions of the valve (8) because it is understood that this passage is possible when the valve (8) adopts intermediate aperture positions. The gas entering through either end exits through the outlet shown in the lower portion and it is in fluid communication with the exhaust line (12).

The valve (8) interposed in the exhaust pipe (4) leaves on either side two tubular segments of the exhaust pipe (4) separated from one another.

FIG. 1 shows the first end position of the valve (8) where the flap (8.2) rests in the seat shown on the left, closing the tubular segment of the exhaust pipe (4) which is in communication with the manifold (9).

In this position, the gas from the first interrelated product enters through the tubular segment of the exhaust pipe (4) and heads directly towards the exhaust line (12).

The gas exiting the first interrelated product can also reach the manifold (9), passing through the heat exchanger (3), being cooled after transferring heat to the coolant and available for exiting through the outlet (10) of the manifold (9) to reach the intake of the internal combustion engine as established by the regulation imposed by the EGR valve (14).

In this end position of the valve (8), the heat exchanger (3) acts as an EGR gas cooler.

FIG. 2 shows the second end position of the valve (8) where its flap (8.2) is located acting as a seat in the seat located on the right, closing the inlet to the valve (8) in communication with the tubular segment of the exhaust pipe (4) in fluid communication with the first interrelated product.

In this position of the valve (8), the gas can only enter the second interrelated product through the heat exchanger (3) through the inlet (3.6). Part of the cooled gas can have access to the outlet (10) of the manifold (9) to be taken to the intake of the internal combustion engine, depending on the actuation of the EGR valve (14), and the rest of the gas reaching the manifold (9) is aimed towards the valve (8) through the tubular segment of the exhaust pipe (4) located between the valve (8) and the manifold (9). This second flow is evacuated into the atmosphere after having transferred part of its heat to the coolant during its passage through the heat exchanger (3). This transferred heat is recovered heat because it would have otherwise ended up being evacuated into the atmosphere.

Although the two end positions of the valve (8) are of particular interest, partial aperture positions can be adopted in all the embodiments.

Likewise, a partial throttle valve of the outlet line (12) can be incorporated in all cases to increase pressure in this line and favor the entry of EGR gas through the outlet (10) of the manifold (9).

The invention claimed is:
1. A heat recovery unit comprising:
a heat exchanger formed by a shell housing one or more exchange tubes or pipes extending in a longitudinal direction X-X', where the tube or the plurality of tubes or pipes extend between a first inlet or outlet and a second inlet or outlet arranged at both ends of the shell, respectively; and where the inside of the heat exchanger is adapted to allow the circulation of a coolant fluid to remove the heat from the fluid passing through the tube or the plurality of tubes or pipes,
an exhaust pipe arranged essentially parallel to the longitudinal direction X-X',
a base formed essentially by a plate, oriented essentially perpendicular to the longitudinal direction X-X', adapted to be coupled and fixed to a support of a catalytic converter or a particle filter comprising a primarily cylindrical main body defining a longitudinal direction X-X', with a gas inlet at a first end and a gas outlet at a second end opposite to the first end, where the main body internally comprises the catalytic converter, a particle filter or both,
the support adapted to anchor the heat recovery unit, where said support is formed by a plate with one or more inner perforations for the passage of gas; and
wherein the base presents at least:
a first perforation coinciding with a perforation of the support in its operating position, housing one end of the heat exchanger,
a second perforation coinciding with a perforation of the support in its operating position, housing one end of the exhaust pipe, a manifold comprising:
a first seat housing one end of the heat exchanger, the end opposite to the end housed in the base,
a second seat housing one end of the exhaust pipe,
an outlet pipe,
a valve interposed in the exhaust pipe with an outlet in fluid communication with an exhaust line such that the valve has two end positions including:
a first end position allowing passage from the catalytic converter or particle filter to the exhaust line, closing communication between the manifold and the exhaust line for cooling EGR gas; and,
a second end position allowing passage from the manifold to the exhaust line, closing communication between the catalytic converter or particle filter and the exhaust line for recovering heat by means of the heat exchanger,
such that the heat exchanger and the exhaust pipe together with the valve thereof are interposed between the base and the manifold.

2. The heat recovery unit according to claim 1, where the manifold has a flange on which the first seat and the second seat are arranged.

3. The heat recovery unit according to claim 1, where a final end of the heat exchanger, a final end of the exhaust pipe or both are arranged coplanar with the base plate.

4. The heat recovery unit according to claim 1 where a final end of the heat exchanger, a final end of the exhaust pipe or both are prolonged, surpassing the base plate.

5. The heat recovery unit according to claim 2 where a final end of the heat exchanger, a final end of the exhaust pipe or both are prolonged, surpassing the base plate.

6. The heat recovery unit according to claim 1 where the heat exchanger comprises a filter.

7. The heat recovery unit according to claim 2 where the heat exchanger comprises a filter.

8. The heat recovery unit according to claim 3 where the heat exchanger comprises a filter.

9. A heat recovery unit comprising:
a heat exchanger formed by a shell housing one or more exchange tubes or pipes extending in a longitudinal direction X-X', where the tube or the plurality of tubes or pipes extend between a first inlet or outlet and a second inlet or outlet arranged at both ends of the shell, respectively; and where the inside of the heat exchanger is adapted to allow the circulation of a coolant fluid to remove the heat from the fluid passing through the tube or the plurality of tubes or pipes,
an exhaust pipe arranged essentially parallel to the longitudinal direction X-X',
a base formed essentially by a plate, oriented essentially perpendicular to the longitudinal direction X-X', adapted to be coupled and fixed to a support, particularly the support of a catalytic converter or particle filter; and
wherein the base presents at least:
a first perforation coinciding with a perforation of the support in its operating position, housing one end of the heat exchanger,
a second perforation coinciding with a perforation of the support in its operating position, housing one end of the exhaust pipe,
a manifold comprising:
a first seat housing one end of the heat exchanger, the end opposite to the end housed in the base,
a second seat housing one end of the exhaust pipe, the end opposite the end housed in the base,
an outlet pipe,
a valve interposed in the exhaust pipe with an outlet in fluid communication with an exhaust line such that the valve has two end positions including:
a first end position allowing passage from the catalytic converter or particle filter to the exhaust line, closing communication between the manifold and the exhaust line for cooling EGR gas; and
a second end position allowing passage from the manifold to the exhaust line, closing communication between the catalytic converter or particle filter and the exhaust line for recovering heat by means of the heat exchanger,
such that the heat exchanger and the exhaust pipe together with the valve thereof are interposed between the base and the manifold.

* * * * *